ALL TRUNK BUSY DETECTION CIRCUIT

Filed May 28, 1957

INVENTORS
John W. Liston
Duncan B. McGregor
BY C. R. Sipe
Atty.

2,895,012

ALL TRUNK BUSY DETECTION CIRCUIT

John W. Liston, Mount Prospect, and Duncan B. McGregor, River Forest, Ill., assignors to General Telephone Laboratories, Incorporated, Chicago, Ill., a corporation of Delaware Application May 28, 1957, Serial No. 662,209

3 Claims. (Cl. 179—18)

Figures 1, 2:
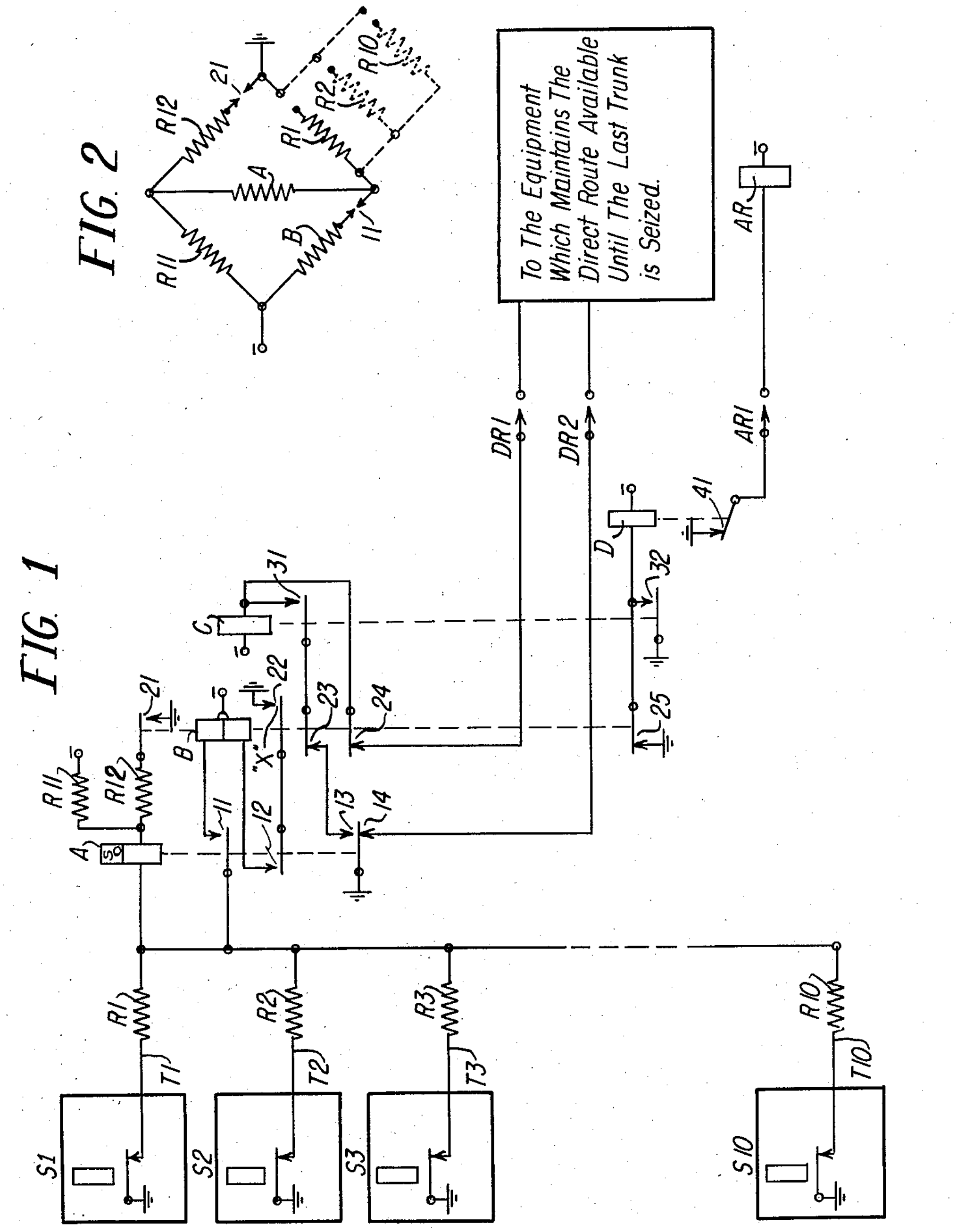

The present invention relates in general to telephone systems and is more particularly concerned with a simple and inexpensive means for indicating the busy or idle condition of a given group of trunks.

It is very often desirable and advantageous to know the busy or idle condition of a particular group of trunks. Thus, when a calling subscriber in one exchange wishes to place a call to a subscriber in a different exchange, a direct route to that other exchange is generally provided through outgoing trunk repeaters located in the office of the calling subscriber. If all of the repeaters of the calling exchange which lead to the called exchange are busy, then an alternate route by way of other equipment or other exchanges or both, may be used. With reference to this alternate routing, it is desirable to know how many direct route trunks are available. By knowing this, an alternate route may be prepared when, say, only one trunk of a particular group remains idle. In this way, the alternate route will be prepared fully before it is necessary to use it and there will be no delay when all of the direct route trunks become busy.

The present disclosure shows a very simple means whereby the three following conditions may be detected: 1. Detection of all trunks busy; 2. Detection of one idle trunk; 3. Detection of two or more idle trunks. This detection is accomplished by means of only two relays and the well-known principal of the Wheatstone bridge.

Having briefly described the basic purpose of this disclosure, a better understanding of the same may be had by a perusal of the following detailed description in conjunction with Figs. 1 and 2. Fig. 1 shows the circuit arrangement of this disclosure as it would appear if this apparatus were placed between a group of outgoing trunk repeaters and a translator. Each of the trunk repeaters of a group would have a trunk leading to the circuit arrangement as shown in the drawing. The busy or idle condition of each repeater of the group being detected either by the presence or absence of ground potential on the individual trunk associated with each repeater. The outgoing leads from the apparatus shown in the drawing terminate in translating equipment which prepares an alternate route for additional calls which may come in after all of the repeaters of the given group are busy.

Fig. 2 is a schematic drawing showing the Wheatstone bridge arrangement found in the circuit of Fig. 1.

It will first be assumed that the repeaters represented by trunks T1–T10 are all idle. In this case ground potential will be present on the trunk leads from each repeater S1–S10 which are idle. With this condition, relay A will be operated from battery through resistance R11 to the ten multiple grounds at trunks T1–T10. At armature 11 of relay A the circuit through the upper winding of relay B is completed to the multiple grounds in the switches S1–S10 by way of trunks T1–T10. At armature 12 the holding circuit through the lower winding of relay B is partially completed. At armature 14 ground is removed from the outgoing trunk DR2.

The energization of relay B through its upper winding by way of armature 11, will cause relay B to operate completely. At armature 21 of relay B, resistance R12 is placed in the operating circuits for relay A and the upper winding of relay B. This resistance completes the Wheatstone bridge circuit arrangement as shown in Fig. 2. At armature 22 the holding circuit for relay B through its lower winding by way of armature 12 is completed. At armature 23 a point in the holding circuit for relay C is opened. At armature 24, battery potential through relay C is removed from the outgoing DR1 trunk. The operation of relay B at armature 25, opens the operating circuit to relay D so that relay D will remain unoperated so long as relay B is operated.

Thus, it can be seen that the normal condition for relays A, B and C when all the trunks of the group are idle, requires the operation of relays A and B. As each repeater becomes busy one of the parallel resistance grounds is removed from the holding circuits of relays A and B. This of course, causes an increase in the resistance of these circuits.

When only one trunk remains idle the circuit will be in a balanced Wheatstone bridge arrangement. Under this condition there will be no flow of current through relay A and relay A will restore. At armatures 11 and 12 of relay A the circuits through both of the windings of relay B are opened and relay B will restore. At armature 14 ground is applied to the outgoing DR2 lead but this is without effect at this time.

Upon the restoration of relay B, resistance R12 is removed from the Wheatstone bridge circuit, thus causing the bridge to become unbalanced. This will result in the reoperation of relay A from battery, through resistance R11, through the winding of relay A, and through the resistance associated with the last idle trunk to ground in the last idle repeater. It should be noted at this point that only one trunk remains idle and when relay A reoperates, the upper winding of relay B is in parallel with relay A, but relay B will not receive enough current under this condition to operate its X contacts at armature 22, and therefore relay B will remain restored.

When relay B resored, battery potential through relay C was applied to the outgoing DR1 lead through armature 24 of relay B. This battery potential is effective to maintain the direct route available until the last idle repeater is seized and in use. At armature 25 of relay B, the operating circuit for relay D is completed and relay D will operate.

The operation of relay D causes ground potential to be applied to the AR 1 lead by way of operated armature 41. This lead is connected to the translator or alternate routing equipment and an alternate route is at once prepared. It should be remembered that there is still one idle repeater to be used and the alternate route will not be utilized until the last repeater becomes busy and the final ground is removed from the operating circuit for relay A, and relay A restores.

It will now be assumed that the last repeater of the group has been seized. This will cause the last ground to be removed from relay A and relay A will restore its contacts. At contact 14, ground potential is applied to the outgoing lead DR2, this ground being effective to release the equipment which maintains the direct route available until the last trunk is seized. At this time, any further calls will take the alternate route as prepared by the AR relay. Since the alternate route was established when one trunk still remained idle there will be no delay when the next call comes in after the all trunk busy condition.

At an all trunks busy condition when one of the repeaters, say S1, in the group becomes idle, ground will be placed on the incoming trunk T1. This ground will complete a circuit through R1, the winding of relay A, resistance R11 to battery. Relay A will thus operate and at armature 11 the upper winding of relay B will be connected in parallel with relay A. As was before pointed out, the upper winding of relay B in parallel with relay A will not permit sufficient current to flow through the upper winding of relay B in order to operate that relay. Therefore relay B will not operate at this time. At armature 12 the holding circuit through the lower winding of relay B is prepared. At contact 14 of relay A, ground is removed from the outgoing DR2 lead. This will cause the direct route to be again reopened, in order that the direct route might be used through the repeater which has become idle after the all trunks busy condition. It will be noted that since relay B is not operated, armature 25 completes the circuit to relay D, thereby holding that relay operated. Thus, the alternate route circuit remains prepared when one trunk becomes idle after an all trunks busy condition. It will be remembered that the same condition existed when only one trunk was idle before an all trunks busy condition. When a second repeater of the group becomes idle, multiple ground will be placed in the operating circuit for relay A. Upon the occurrence of this condition, sufficient current will flow through the upper winding of relay B to cause relay B to operate its X contacts at armature 22. Upon the operation of the X contacts of relay B, relay B will operate completely over its lower winding by way of armature 12 of relay A to ground at armature 22 of relay B.

At armature 21 of relay B an additional ground is placed in the holding circuits for relays A and B, thereby completing an unbalanced Wheatstone bridge. Relays A and B will thereby remain operated so long as two or more trunks remain idle. At armature 24, battery potential by way of relay C is removed from the DR1 lead and that equipment is released. At armature 25 the operating circuit for relay D is opened and relay D will restore thereby releasing the alternate routing equipment.

At this point, it should be mentioned that the description above given is by way of illustration only and that changes in the structure and organization of this invention may be made without deviating from the true spirit and scope thereof. Thus, it may be desirable to utilize this invention to flash signals to an operator and the like. The alternate routing preparation has been used only as a means to describe the true purpose and aim of this disclosure.

What is claimed is:

1. In a telephone system a plurality of trunks, a test conductor and a resistance individual to each trunk, means for normally grounding each of said test conductors through its individual resistance when the corresponding trunk is idle, a busy test circuit connected in multiple to all of said test conductors, a first relay in said test circuit normally energized over said multiple connections when one or more of said trunks are idle, a second relay in said test circuit, contact means for connecting said second relay to said multiple connections in response to the operation of said first relay, means for operating said second relay over said multiple connections only in case a predetermined number of said trunks are idle, control means controlled by the operation of said second relay for establishing an unbalanced Wheatstone bridge circuit arrangement including said first and second relays and said multiple connections, means effective when a certain number of said trunks become busy, for removing certain of said ground connections from said multiple connection to balance said bridge, said first relay restoring in response to said balancing, said contact means restoring said second relay responsive to the restoration of said first relay, said control means effective responsive to the restoration of said second relay for unbalancing said bridge, and said first relay reoperating in response to the last said unbalancing of said bridge.

2. In a telephone system, a plurality of trunks, an all trunks busy test circuit connected to said trunks, a first and a second relay in said test circuit, circuit means effective for operating both of said relays in case a plurality of said trunks are idle, said circuit means effective in response to all but one of said trunks becoming busy for restoring said first and second relays and for reoperating said first relay, said circuit means thereafter effective in response to all of said trunks becoming busy for restoring said first relay, said circuit means effective in response to one of said trunks subsequently becoming idle after said all trunk busy condition, for reoperating said first relay.

3. In a telephone system; a group of trunk repeaters; a test conductor individual to each repeater of said group; a common source of ground potential; a resistance individual to each said test conductor; a plurality of normally complete series circuits each comprising one of the test conductors and the corresponding resistance connected to said common source of ground potential as an indication that the corresponding repeater is idle; a detection circuit bridge having four arms, wherein the first of said arms comprises a first control resistance normally disconnected from said bridge, the second of said arms comprises a second control resistance, the third of said arms comprises a first control relay normally disconnected from said bridge and the fourth of said arms comprises a parallel connection of all said series circuits, with said common ground potential connected at the juncture between said first and said fourth arms; a second control relay connected across said circuit bridge at the juncture between said first and said second arms and the juncture between said third and said fourth arms; a common source of battery potential connected to said circuit bridge at the juncture between said second and said third arms; an operating circuit effective in case at least one of said series circuits are complete for operating said second control relay; an energizing circuit including contact means operated by said operated second control relay for including said first control relay of said third arm in said circuit bridge; said energizing circuit effective in case at least two of said series circuits are complete for operating said first control relay; means operated by said first control relay to include said first control resistance of said first arm in said circuit bridge for thereafter placing said bridge in an unbalanced state during the time that a predetermined number of said repeaters of said group are idle; means at each of said repeaters operated when said repeater becomes busy for removing the corresponding series circuit from said parallel connection; said circuit bridge being in a balanced state at the time that all of said repeaters but one in said group becomes busy, whereby said operating circuit is ineffective and said second control relay restores; said contact means released by said restoration of said second control relay for opening said energizing circuit to restore said first control relay; an alternate trunk route; and means controlled in response to said restoration of said first control relay for preparing said route for use at the time said last trunk in said group becomes busy.

References Cited in the file of this patent

UNITED STATES PATENTS

| | | |
|---|---|---|
| 2,024,275 | Clark | Dec. 17, 1935 |
| 2,025,407 | Williams | Dec. 24, 1935 |
| 2,421,919 | Avery | June 10, 1947 |